(12) United States Patent
Murison et al.

(10) Patent No.: US 7,940,453 B2
(45) Date of Patent: May 10, 2011

(54) FIBER AMPLIFIERS AND FIBER LASERS WITH REDUCED OUT-OF-BAND GAIN

(75) Inventors: Richard Murison, St-Lazare (CA);
Tullio Panarello, St-Lazare (CA);
Benoit Reid, Laval (CA); Reynald Boula-Picard, Montreal (CA)

(73) Assignee: Pyrophotonics Lasers Inc., Dollard-Des-Ormeaux, Quebec (CA)

( * ) Notice: Subject to any disclaimer, the term of this patent is extended or adjusted under 35 U.S.C. 154(b) by 726 days.

(21) Appl. No.: 11/834,472

(22) Filed: Aug. 6, 2007

(65) Prior Publication Data
US 2008/0030847 A1   Feb. 7, 2008

Related U.S. Application Data

(60) Provisional application No. 60/836,244, filed on Aug. 7, 2006.

(51) Int. Cl.
*H01S 3/00* (2006.01)
(52) U.S. Cl. .................. 359/341.1; 359/341.3
(58) Field of Classification Search ............... 359/341.1, 359/341.3
See application file for complete search history.

(56) References Cited

U.S. PATENT DOCUMENTS

| | | |
|---|---|---|
| 5,131,069 A | 7/1992 | Hall et al. |
| 5,260,823 A | 11/1993 | Payne et al. |
| 6,556,346 B1 * | 4/2003 | Di Pasquale et al. ...... 359/341.5 |
| 6,606,337 B1 * | 8/2003 | King ............................. 372/70 |
| 2005/0094253 A1 * | 5/2005 | Terahara .................... 359/337.1 |

FOREIGN PATENT DOCUMENTS

CA    2029702    5/1991

OTHER PUBLICATIONS

Bayart et al., "Experimental Investigation of the Gain Flatness Characteristics for 1.55 µm Erbium-Doped Fluoride Fiber Amplifiers," IEEE Photonics Technology Letters, vol. 6, No. 5, May 1994, pp. 613-615.
International Search Report and Written Opinion of PCT Application No. PCT/CA2007/001386, dated Nov. 30, 2007, 12 pages total.

* cited by examiner

*Primary Examiner* — Mark Hellner
(74) *Attorney, Agent, or Firm* — Kilpatrick Townsend & Stockton LLP

(57) ABSTRACT

A method of operating a fiber amplifier characterized by a spectral gain curve includes providing an input signal at a signal wavelength. The signal wavelength lies within an in-band portion of the spectral gain curve extending from a first in-band wavelength to a second in-band wavelength, the in-band portion being characterized by a first amplitude range. The method also includes providing pump radiation at a pump wavelength. The pump wavelength is less than the signal wavelength. The method further includes coupling the pump radiation to the fiber amplifier and amplifying the input signal to generate an output signal. All portions of the spectral gain curve at wavelengths less than the first in-band wavelength and greater than the pump wavelength are characterized by a second amplitude less than or equal to 10 dB greater than the first amplitude range.

16 Claims, 11 Drawing Sheets

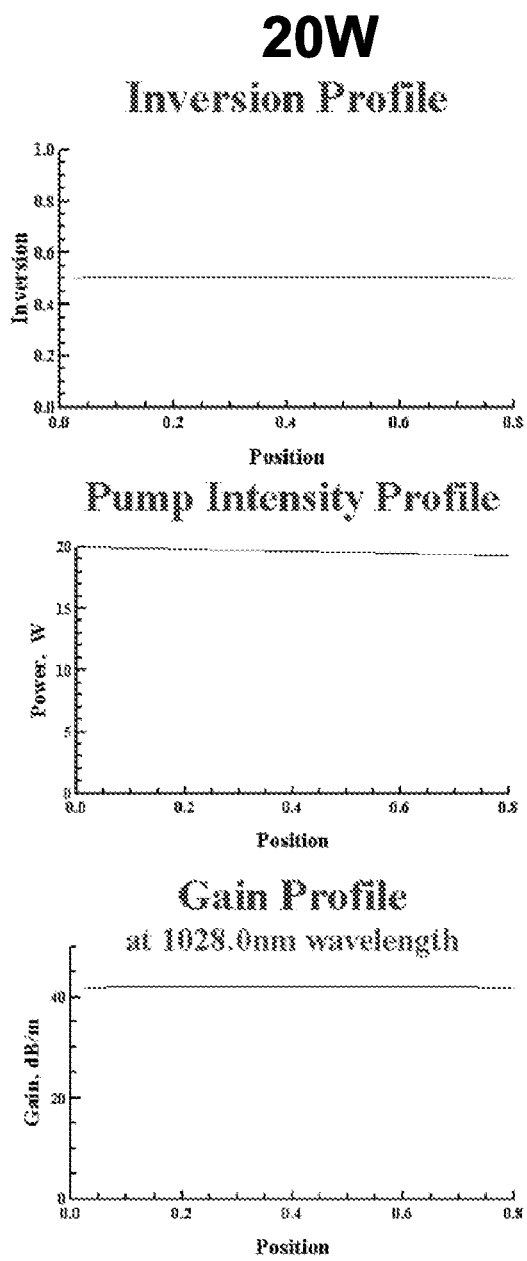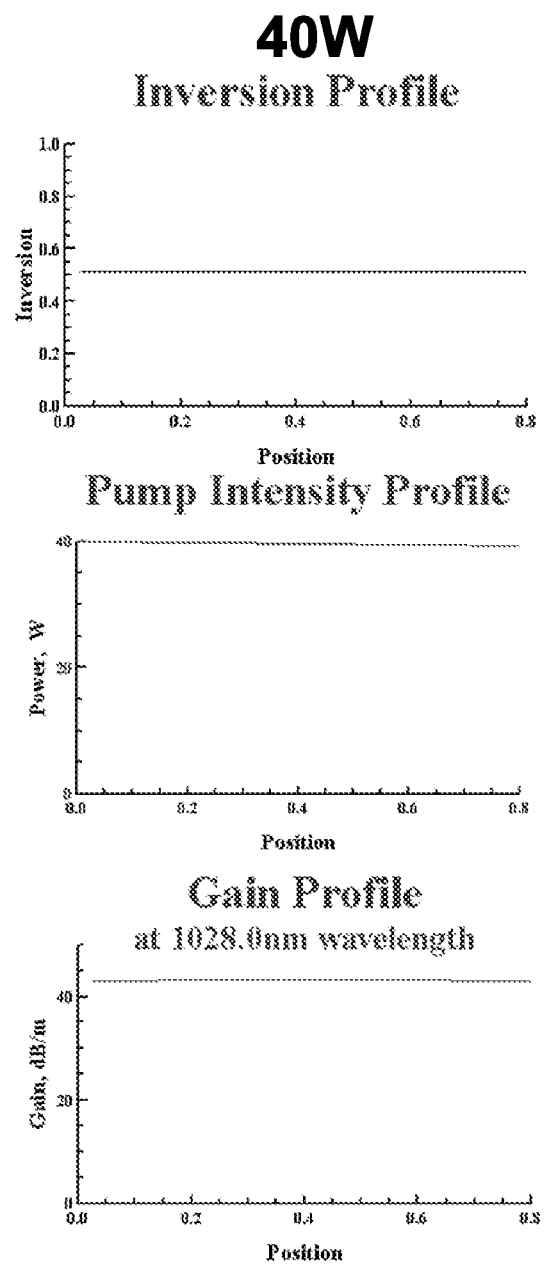
FIG. 12                    FIG. 13

FIBER AMPLIFIERS AND FIBER LASERS WITH REDUCED OUT-OF-BAND GAIN

CROSS-REFERENCES TO RELATED APPLICATIONS

The present application claims benefit under 35 U.S.C. §119(e) of U.S. Provisional Patent Application No. 60/836,244, filed Aug. 7, 2006, entitled "Fiber amplifiers and fiber lasers with reduced out-of-band gain," the disclosure of which is incorporated herein by reference in its entirety.

BACKGROUND OF THE INVENTION

The present invention relates generally to the field of optical amplifiers and lasers. More particularly, the present invention relates to methods and systems related to optically excited rare-earth doped optical fiber gain medium. Merely by way of example, the methods and systems have been applied to reducing out-of-band gain and amplified spontaneous emission in optical fibers. But it would be recognized that the invention has a much broader range of applicability.

Conventional laser-based material processing has generally used high peak power pulsed lasers, for example, Q-switched Nd:YAG lasers operating at 1064 nm, for marking, engraving, micro-machining, and cutting applications. More recently, laser systems based on fiber gain media have been developed. In some of these fiber-based laser systems, fiber amplifiers are utilized.

Some optical amplifiers and lasers utilizing a fiber gain medium are optically pumped, often by using semiconductor lasers pumps. The fiber gain medium is typically made of silica glass doped with rare-earth elements. The choice of the rare-earth elements and the composition of the fiber gain medium depends on the particular application. One such rare-earth element is ytterbium, which is used for optical amplifiers and lasers emitting in the 1020 nm-1100 nm range. Another rare-earth element used in some fiber gain medium is erbium, which is used for optical amplifiers and lasers emitting in the 1530 nm-1560 nm range.

The wavelength of the optical pump source used for ytterbium-doped fiber amplifiers and lasers is typically in the wavelength range of 910 nm to 980 nm. The wavelength of the optical pump source used for erbium-doped fiber amplifiers and lasers is typically in a wavelength range centered at about 980 nm or about 1480 nm. When ytterbium-doped or erbium-doped fiber amplifiers are pumped at the above mentioned wavelengths, they generally have significant gain and amplified spontaneous emission (ASE) outside of the wavelength range of interest, i.e., the lasing or amplification wavelength. For example, when an ytterbium-doped fiber gain medium is pumped at a wavelength of about 915 nm, it generates high gain and ASE at about 976 nm; when it is pumped at a wavelength of around 976 nm, it generates high gain and ASE at about 1030 nm. In the case of erbium-doped fiber, pumping at wavelengths of 980 nm or 1480 nm generates high gain and ASE at around 1530 nm.

As a result of the out-of-band gain, i.e., the gain present outside the wavelength range of interest, it is possible for the amplifiers or the lasers to produce ASE or start lasing at these out-of-band wavelengths. Such ASE or lasing will limit the amount of gain available at the wavelength of interest. In some amplifier applications, large out-of-band ASE will limit the available gain and the ASE power may be larger than the signal power at the wavelength of interest.

Thus, there is a need in the art for fiber-based amplifiers and lasers with reduced out-of-band ASE and gain.

SUMMARY OF THE INVENTION

According to the present invention, techniques related generally to the field of optical amplifiers and lasers are provided. More particularly, the present invention relates to a method and apparatus for amplifying to high power laser pulses for industrial applications such as trimming, marking, cutting, and welding. Merely by way of example, the invention has been applied to ytterbium-doped fiber laser amplifiers. However, the present invention has broader applicability and can be applied to other sources.

According to an embodiment of the present invention, a method of operating a fiber amplifier characterized by a spectral gain curve is provided. The method includes providing an input signal at a signal wavelength. The signal wavelength lies within an in-band portion of the spectral gain curve extending from a first in-band wavelength to a second in-band wavelength, the in-band portion being characterized by a first amplitude range. The method also includes providing pump radiation at a pump wavelength. The pump wavelength is less than the signal wavelength. The method further includes coupling the pump radiation to the fiber amplifier and amplifying the input signal to generate an output signal. All portions of the spectral gain curve at wavelengths less than the first in-band wavelength and greater than the pump wavelength are characterized by a second amplitude less than or equal to 10 dB greater than the first amplitude range.

According to another embodiment of the present invention, a method of operating an ytterbium-doped fiber amplifier is provided. The method includes providing an input signal at a wavelength between 1050 nm and 1090 nm, providing pump radiation at a wavelength between 1010 nm and 1050 nm, and coupling the pump radiation to the ytterbium-doped fiber amplifier. The method also includes amplifying the input signal to generate an output signal.

According to yet another embodiment of the present invention, a method of operating an ytterbium-doped fiber amplifier is provided. The method includes providing an input signal at a wavelength between 1050 nm and 1090 nm, providing seed radiation at a wavelength between 1010 nm and 1050 nm, and coupling the seed radiation to the ytterbium-doped fiber amplifier. The method also includes providing pump radiation at a wavelength between 910 nm and 1050 nm, coupling the pump radiation to the fiber amplifier, and amplifying the input signal to generate an output signal.

According to an alternative embodiment of the present invention, a method of operating a fiber amplifier is provided. The method includes providing an input signal at a signal wavelength and providing pump radiation at a pump wavelength. The pump radiation is characterized by an input pump power. The method also includes coupling the pump radiation to the fiber amplifier. The input pump power is high enough to result in a substantially uniform population inversion as a function of fiber length.

According to a particular embodiment of the present invention, a method of operating a fiber amplifier is provided. The method includes providing an input signal at a signal wavelength. An in-band portion of a spectral gain curve characterized by a first peak amplitude is associated with the signal wavelength. The method also includes providing pump radiation at a pump wavelength. The pump wavelength is less than the signal wavelength. The method further includes coupling the pump radiation to the fiber amplifier and amplifying the input signal to generate an output signal. An out-of-band portion of the spectral gain curve characterized by a second peak amplitude and associated with the signal wavelength is less than the in-band portion of the spectral gain curve.

According to another particular embodiment of the present invention, a method of operating an Ytterbium-doped fiber amplifier is provided. The method includes providing an input signal at a wavelength between 1050 nm and 1090 nm, providing pump radiation at a wavelength between 1010 nm and 1050 nm, coupling the pump radiation to the Ytterbium-doped fiber amplifier and amplifying the input signal to generate an output signal.

According to yet another particular embodiment of the present invention, a method of operating an Ytterbium-doped fiber amplifier is provided. The method includes providing an input signal at a wavelength between 1050 nm and 1090 nm, providing seed radiation at a wavelength between 1010 nm and 1050 nm, coupling the seed radiation to the Ytterbium-doped fiber amplifier, providing pump radiation at a wavelength between 910 nm and 1050 nm, coupling the pump radiation to the fiber amplifier, and amplifying the input signal to generate an output signal.

According to an additional particular embodiment of the present invention, a method of operating a fiber amplifier is provided. The method includes providing an input signal at a signal wavelength and providing pump radiation at a pump wavelength. The pump radiation is characterized by an input pump power. The method also includes coupling the pump radiation to the fiber amplifier. The input pump power is high enough to result in a substantially uniform population inversion as a function of fiber length.

According to a specific embodiment of the present invention, a method of operating a fiber amplifier is provided. The method includes providing an input signal at a signal wavelength and providing pump radiation at a pump wavelength. The pump radiation is characterized by an input pump power. The method also includes coupling the pump radiation to the fiber amplifier. The input pump power is high enough to result in an amount of the pump radiation exiting an output end of the fiber with a value at least greater than or equal to an amount of the pump radiation being absorbed in the fiber.

According to another specific embodiment of the present invention, an optical amplifier is provided. The amplifier includes a length of rare-earth-doped fiber to amplify optical pulse signal at a first wavelength. The optical signal wavelength is located outside of a gain peak of the rare-earth-doped fiber. The amplifier also includes an optical pump light at a second wavelength, which is injected into the length of rare-earth-doped fiber. The pump light wavelength is located nearby of a gain peak of the rare-earth-doped fiber, such that the amplified spontaneous emission and the gain at the peak are substantially reduced.

According to yet another specific embodiment of the present invention, an optical amplifier is provided. The amplifier includes a length of rare-earth-doped fiber to amplify optical pulse signal at a first wavelength. The optical signal wavelength is located outside of a gain peak of the rare-earth-doped fiber. The amplifier also includes and optical seed light at a second wavelength, which is injected into the length of rare-earth-doped fiber. The seed light wavelength is located nearby of a gain peak of the rare-earth-doped fiber. The optical amplifier further includes an optical pump light at a third wavelength, which is also injected into the length of rare-earth-doped fiber. The pump light wavelength is chosen such that a substantial portion of the pump light is converted to light at the seed wavelength, and such that the amplified spontaneous emission and the gain at the peak are substantially reduced.

Numerous benefits are achieved using the present invention over conventional techniques. For example, in an embodiment according to the present invention utilizing seed signals, optical pulses can be amplified to high powers at wavelengths outside of the natural gain peak, with improved stability in comparison to lasers with comparable performance characteristics. Moreover, in embodiments of the present invention, short pulses are generated with a reduced ASE background. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

BRIEF DESCRIPTION OF THE DRAWINGS

FIG. 12 illustrates the upper-level population, the residual pump power, and the gain profile at 1028 nm along a fiber length for a pumping power of 20 W according to an embodiment of the present invention;

FIG. 13 illustrates the upper-level population, the residual pump power, and the gain profile at 1028 nm along a fiber length for a pumping power of 20 W according to an embodiment of the present invention.

DETAILED DESCRIPTION OF SPECIFIC EMBODIMENTS

Figure 1A:
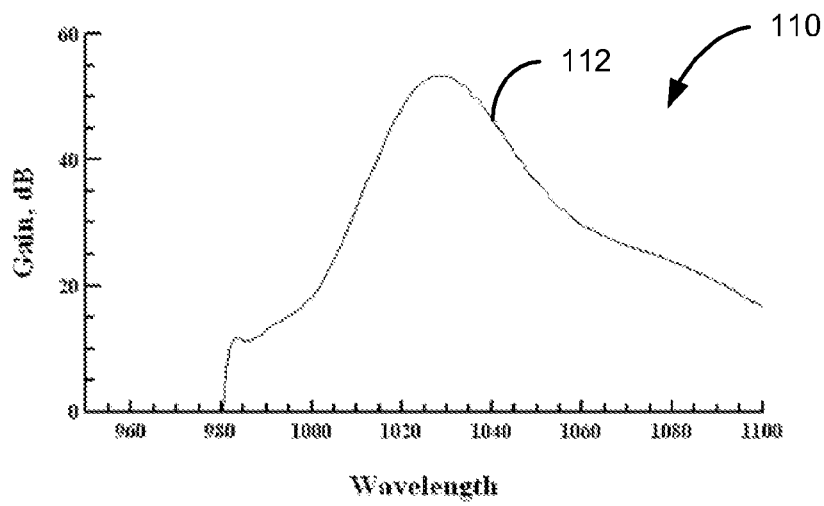
FIG. 1A is a simplified illustration of spectral gain in an ytterbium-doped amplifier optically pumped at 976 nm.

FIG. 1A is a simplified illustration of spectral gain in an ytterbium-doped amplifier optically pumped at 976 nm. To produce the spectral gain curve 110 illustrated in FIG. 1A, an ytterbium-doped optical fiber was core-pumped at a wavelength of 976 nm with 500 mW of pump power. The length of optical fiber was selected to achieve close to 30 dB of gain at 1064 nm. To generate the spectral gain data presented in FIG. 1A, the inversion of the active material was about 47%. A significant portion of the pump light is absorbed during pumping of the ytterbium amplifier.

Referring to FIG. 1A, a substantial gain peak 112 is present in the spectral gain curve at a wavelength of about 1030 nm. For applications in which either lasing or amplification at a wavelength of 1064 nm is desired, the gain peak 112 at about 1030 nm represents out-of-band gain. In the example illustrated in FIG. 1A, the gain peak 112 is over 50 dB. It will be appreciated that the high value of gain peak 112 may results in parasitic lasing or instabilities at about 1030 nm, which might limit the gain available at 1064 nm and increase the noise at 1064 nm. Embodiments of the present invention reduce the out-of-band gain peak 112, thereby providing benefits not available using conventional techniques.

Figure 1B:
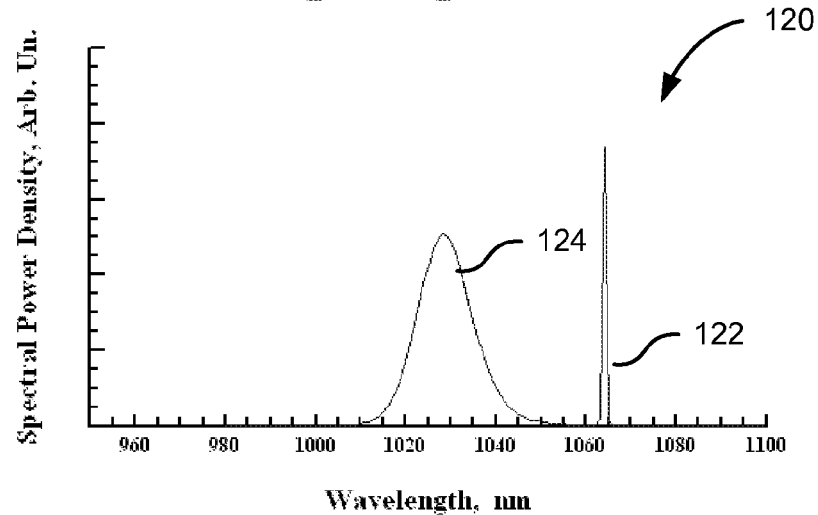
FIG. 1B is a simplified illustration of an output spectrum of an ytterbium-doped amplifier optically pumped at 976 nm.

FIG. 1B is a simplified illustration of an output spectrum 120 of an ytterbium-doped amplifier optically pumped at 976 nm. Peak 122 in the output spectrum 120 illustrates an amplified output at the desired wavelength of 1064 nm. However, peak 124 illustrates that substantial output power is present in an ASE peak 124 located at a wavelength of about 1030 nm. In some applications, the out-of-band power in peak 124 reduces the gain at the desired wavelength of 1064 nm and results in a decrease in amplifier efficiency (e.g., output power/pump power).

Figure 2:
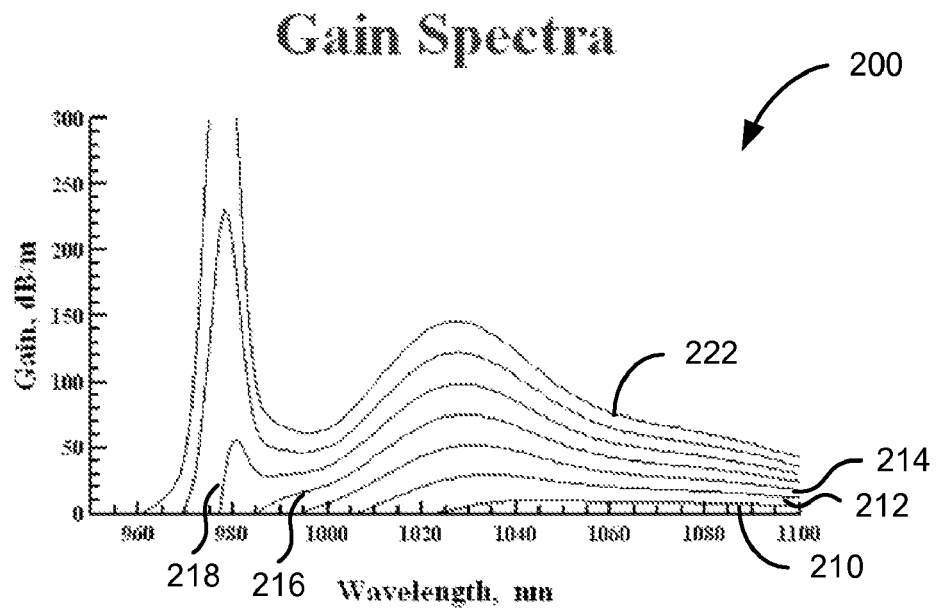
FIG. 2 is a simplified illustration of spectral gain at various levels of population inversion in an ytterbium-doped fiber amplifier.

FIG. 2 is a simplified illustration of spectral gain at various levels of population inversion in an ytterbium-doped fiber amplifier. For the spectral gain curves illustrated in FIG. 2, the inversion is substantially uniform as a function of fiber length. As a result, the gain of the amplifier is substantially uniform as a function of length. In order to generate an inversion that is substantially uniform as a function of length, a pump source is provided that generates an amount of optical power in excess of that which can be absorbed by the active medium in the fiber amplifier. Typically, the pump power will exceed the absorbed power by a factor of two or more. In a specific embodiment, as described below, the pump power is greater than the absorbed power by a factor of about five.

Referring to FIG. 2, curve 210 represents a population inversion of 10%, curve 212 represents a population of 20%, and curve 214 represents a population inversion of 30%. The remaining curves represent a population inversion increasing by 10% per curve, with curve 222 representing a population inversion of 70%.

In order to generate the curves illustrated in FIG. 2, the pump wavelength was varied from longer wavelengths, which are associated with lower inversions, to shorter wavelengths, which are associated with higher inversions. Referring to curve 210, a pump wavelength of about 1020 nm was used. The power of the pump source, the length of the fiber, the doping density, and the like were selected so that the absorption of the pump light was substantially uniform as a function of length, resulting in a substantially uniform inversion of about 10% along the length of the fiber. Generally, for longer fibers, higher pump powers are provided to produce a uniform inversion.

For conditions in which the inversion is uniform along the length of the gain medium, additional increases in pump power will not result in significant increases in absorption by the active medium or additional inversion. Thus, the curves in FIG. 2 can be considered to as "maximum inversion" curves—the maximum inversion is reached given the wavelength of the pump source. It will be appreciated that as the active medium absorbs additional pump light, the emission rate will balance the absorption rate, resulting in a maximum absorption and a limit on the percent of the active medium inverted.

As illustrated in FIG. 2, the choice of pump wavelength determines the maximum population inversion that can be achieved. Although the population inversion may be uniform as a function of length, for example, about 30% as illustrated by curve 214, the gain is a function of wavelength. For pumping into a given upper-state band, this maximum population inversion decreases as the pump wavelength increases. This maximum population inversion at a given pump wavelength dictates the value of the gain as a function of wavelength. When the maximum population inversion is reached for any pump wavelength, the gain at the pump wavelength will be exactly 0 dB.

For example, referring to FIG. 2, at a pumping wavelength of 960 nm (curve 222), the 70% population inversion curve can be seen to give approximately 0 dB gain at 960 nm. Consequently, a 960 nm pump wavelength would permit a maximum population inversion of ~70%. For curve 216, with a 40% population inversion, the gain at the pump wavelength of 985 nm is approximately 0 dB. Referring to FIG. 2, with 70% inversion (curve 222), the optical gain at both 976 nm and at 1030 nm is substantially larger than the optical gain at 1064 nm. As a result, the maximum gain available to a fiber amplifier or fiber laser operating at 1064 nm may be limited when the amplifier is pumped at 960 nm.

Embodiments of the present invention provide systems that reduce the out-of-band gain with respect to the in-band gain. The particular levels selected for the out-of-band gain and the in-band gain will depend on the particular applications. In a particular embodiment, the out-of-band gain is generated at a level that is negligible. In other embodiments, the out-of-band gain is merely reduced, so that it is less than or equal to 3 dB greater than the in-band gain. One of ordinary skill in the art would recognize many variations, modifications, and alternatives.

Referring again to FIG. 2, in the case of a ytterbium-doped optical amplifier intended to be operated at a signal wavelength of 1064 nm (i.e., an in-band wavelength of 1064 nm), it may be advantageous to choose a population inversion of approximately 5%-25% (generally represented by curves 210-214), which reduces the out-of-band gain peaks at both 976 nm and 1030 nm that otherwise dominate at higher inversion levels. Therefore in a specific embodiment, a pump wavelength in the range from about 1000 nm to about 1040 nm is utilized as the optical pump in generating 1064 nm output, as determined by the 0 dB gain value for the 5% and 25% inversion curves.

Referring to curve 210, which has a pump wavelength of about 1020 nm, the gain at 1064 nm is about 10 dB/meter at a population inversion of 10%. Thus, to obtain a gain of 60 dB, 6 meters of fiber are utilized. In other embodiments, a gain of 30 dB would require 3 meters of fiber. As long as the fiber amplifier is uniformly inverted along its length, increases in length result in corresponding increases in gain. In contrast to low levels of inversion associated with curves 210 and 212, if a conventional pump wavelength of 976 nm is utilized (curve 218), the gain at 1064 nm is about 60 dB/meter. Thus, in a conventional fiber amplifier a single meter of fiber would produce a gain of 60 dB, or 30 dB of gain would require half a meter of fiber. However, the out-of-band gain at 1030 nm for curve 218 is significant (~100 dB/meter). As a result of this high out-of-band gain in comparison to the in-band gain at 1064 nm, undesirable ASE, lasing, and the like result. As the pump wavelength is decreased below 976 nm, the out-of-band continues to increase in relation to the in-band gain. To reduce the out-of-band gain ion conventional systems, techniques that generally result in increased system complexity and cost are utilized. One of ordinary skill in the art would recognize many variations, modifications, and alternatives.

Figure 3:
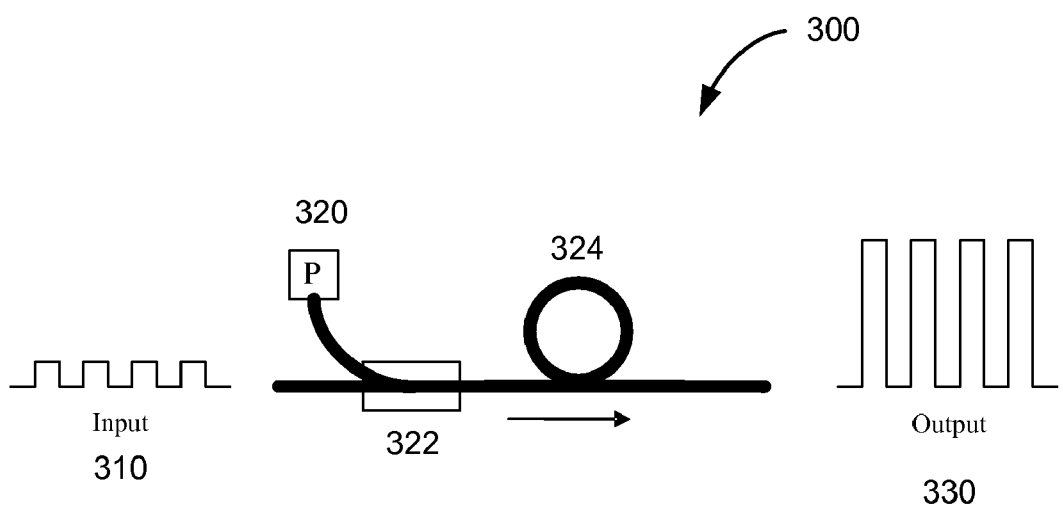
FIG. 3 is a simplified schematic illustration of an optical fiber amplifier with reduced out-of-band gain according to an embodiment of the present invention.

FIG. 3 is a simplified schematic illustration of an optical fiber amplifier with reduced out-of-band gain according to an embodiment of the present invention. Optical amplifier 300 amplifies a 1064 nm input optical pulse train 310 to produce an output optical pulse train 330 at 1064 nm. Optical fiber amplifier 300 includes a length of rare-earth-doped fiber gain medium 324. In embodiments of the present invention, the length of rare-earth-doped fiber gain medium 324 is a predetermined length and includes, but is not limited to rare-earth-doped single-clad, double-clad, or even multiple-clad optical fibers. The rare-earth dopants used in such fibers include ytterbium, erbium, holmium, praseodymium, thulium, neodymium, combinations of these elements, and the like. In a particular embodiment, the fiber-optic based components utilized in constructing optical fiber amplifier 300 utilize polarization-maintaining single-mode fiber.

Referring to FIG. 3, in a particular embodiment, pump laser 320 is optically coupled to a first side of the rare-earth-doped fiber gain medium 324 through optical coupler 322. The pump laser 320 is a semiconductor diode laser producing optical output at a predetermined wavelength and having a predetermined spectral bandwidth. It will be appreciated that the use of a semiconductor laser source for pump laser 320 will provide pump radiation with a narrow spectral bandwidth. According to embodiments of the present invention, the wavelength of the semiconductor pump laser 320 is selected to be in the range of about 1000 nm to about 1040 nm. In a particular embodiment, the pump wavelength of pump laser 320 is 1030 nm. Merely by way of example, the optical coupler 322 may be a Wavelength Division Multiplexer (WDM) or a multi-mode pump combiner with signal feedthrough. Such optical couplers are available from Sifam Fibre Optics, Torquay, United Kingdom.

The power of the pump laser 320 is selected to produce a substantially uniform inversion as a function of the length of the fiber amplifier gain medium 324. In a particular embodiment, the optical power coupled into the fiber amplifier gain medium 324 through optical coupler 322 is 500 mW. Generally, a pump laser 320 of greater than or equal to 500 mW is utilized in this embodiment. For a fiber amplifier according to an embodiment of the present invention, the optical power absorbed by the fiber amplifier gain medium 324 is about 100 mW, resulting in about 400 mW of optical pump power exiting the end of the fiber along with the output pulses 330 at the wavelength of the input pulses 310, for example, 1064 nm. Thus, the optical power exiting the fiber amplifier 300 at the pump wavelength is four times the optical power absorbed by the fiber amplifier gain medium 324.

Because the population inversion and gain are substantially uniform as a function of fiber length, the gain is linear with length, so that if at the signal wavelength, the gain is 10 dB for a 1 meter fiber, the gain will be 20 dB for a 2 meter fiber. This correspondence between gain and fiber length will result as long as there is significant pump leakage at the end of the fiber. It will be appreciated that because of the relatively small portion of the pump power absorbed by the gain medium, embodiments of the present invention contrast with conventional fiber amplifiers in which significantly more pump power is absorbed in the gain medium.

Characterization of fiber amplifiers provided according to embodiments of the present invention may be carried out using the following procedures. These characterization procedures are not intended to limit the scope of the present invention, but are merely provided by way of example. The power of the input signal (either peak pulse power, time-averaged power, or other measures) and the power of the output signal are measured to determine the gain at the signal wavelength, for example, 1064 nm. The gain at other wavelengths, for example, 1030 nm, is measured using either a tunable laser source or a series of sources operating at a number of wavelengths. Accordingly, the spectral gain curve for the fiber amplifier is measured, providing data similar to FIG. 2. Depending on the pump wavelength, curves similar to the curves illustrated in FIG. 2 will result from these measurements.

In order to determine the inversion as a function of fiber amplifier length, power measurements of the pump laser output, coupling coefficients to the fiber, and power measurements of optical power exiting the amplifier at the pump laser wavelength are made. Variations in pump power, along with other techniques, may be used to determine the uniformity of the population inversion as a function of length. At low pump power levels, increases in pump power will result in significant portions of the pump energy being absorbed. As the pump power level is raised, increases in pump power will produce a decreasing portion of absorbed pump energy as the gain medium becomes uniformly inverted along the length of the fiber amplifier. Based on the characterization of the system performance, comparisons may be provided between the gain at the signal wavelength and the gain at out-of-band wavelengths.

Figure 4A:
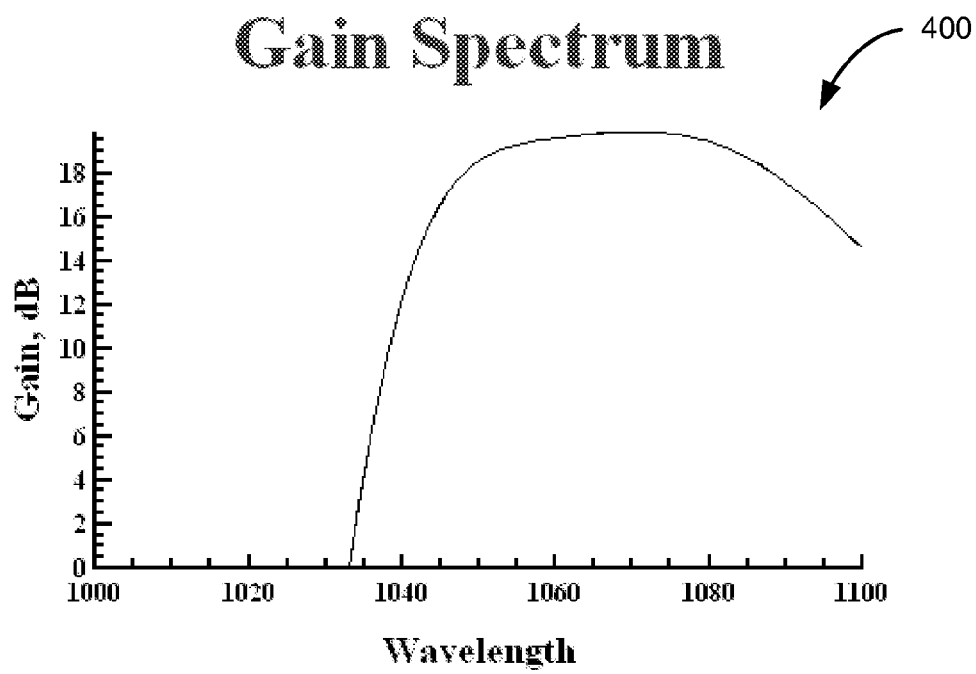
FIG. 4A is a simplified illustration of a gain spectrum for an optical fiber amplifier according to an embodiment of the present invention.

FIG. 4A is a simplified illustration of a gain spectrum for an optical fiber amplifier according to an embodiment of the present invention. Merely by way of example, the gain spectrum for an ytterbium-doped fiber amplifier is illustrated in FIG. 4A. The gain spectrum of the ytterbium-doped optical fiber amplifier is illustrated for core pumping at a pump wavelength of 1030 nm. The pump power for the embodiment illustrated in FIG. 4A is 500 mW. The ytterbium doping level is approximately $5 \times 10^{24}$ ions/m$^3$. In a specific embodiment, the length of optical fiber was selected to achieve approximately 22 dB of gain at the signal wavelength of 1064 nm. As can be seen in FIG. 4A, in contrast to conventional fiber amplifier, the peak of the spectral gain curve is centered at about the signal wavelength, thereby preventing a variety of potential instabilities and/or parasitic lasing at out-of-band wavelengths. At a particular out-of-band wavelength of 1030 nm, the gain is less than 0 dB.

Figure 4B:
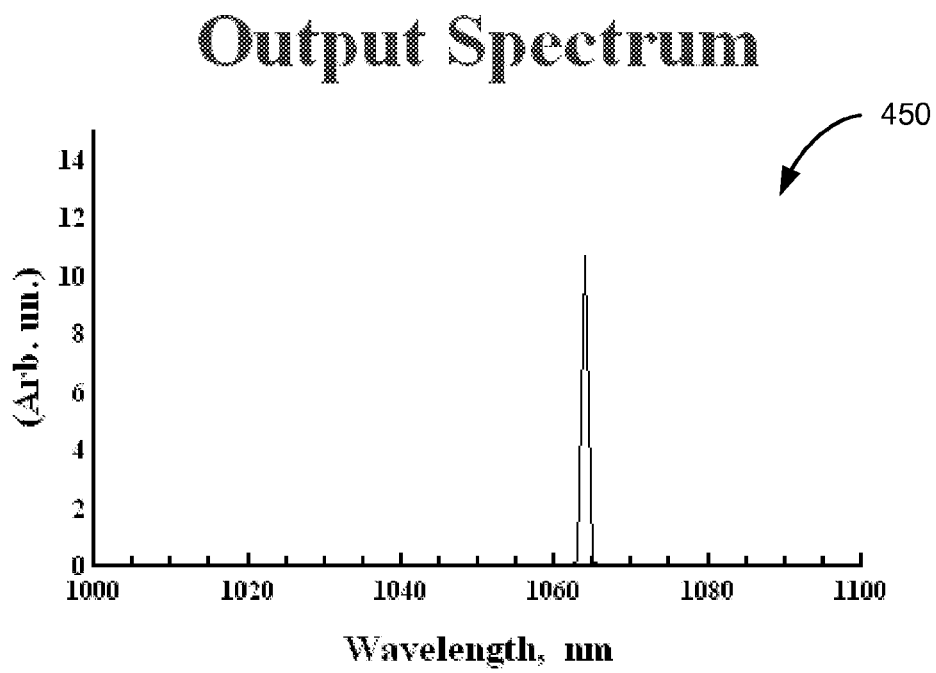
FIG. 4B is a simplified illustration of an output spectrum for an optical fiber amplifier according to an embodiment of the present invention.

FIG. 4B is a simplified illustration of an output spectrum for an optical fiber amplifier according to an embodiment of the present invention. As illustrated in FIG. 4B, the output spectrum illustrates lasing at the signal wavelength and minimal out-of-band ASE. The reductions in out-of-band gain provided by embodiments of the present invention enable the fabrication of optical amplifiers and lasers that are more stable and have higher gain at the useful signal wavelength.

Figure 5:
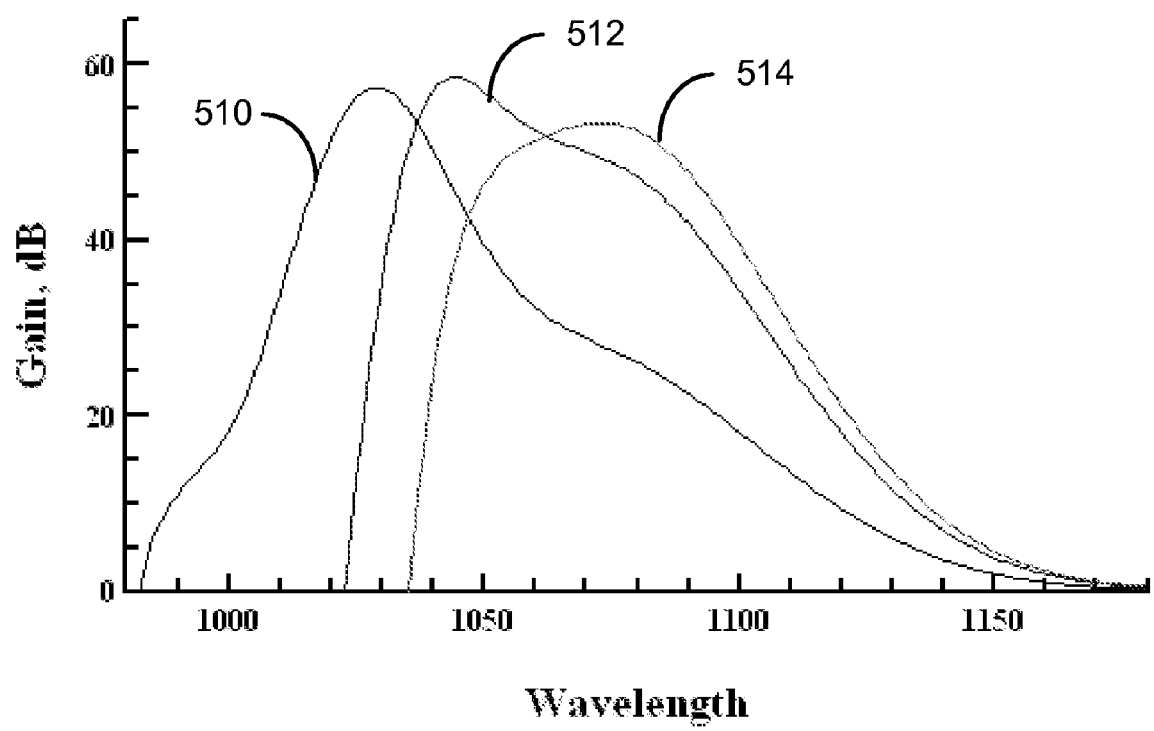
FIG. 5 is a simplified illustration of a gain spectrum for ytterbium-doped optical fiber amplifiers of various lengths.

FIG. 5 is a simplified illustration of a gain spectrum for ytterbium-doped optical fiber amplifiers of various lengths. In particular, gain spectra are illustrated for ytterbium-doped optical fibers with lengths of 0.6 meters (510), 5 meters (512), and 10 meters (514). The optical fibers are clad-pumped with 40 W of optical power at 976 nm. The optical fiber used in generating the gain spectrum shown in FIG. 5 is a double-clad fiber with a core diameter of 30 μm and an inner clad diameter of 250 μm. The ytterbium doping level is $9.2 \times 10^{25}$ $m^{-3}$ in the core. This ytterbium doping level is selected to provide operation in the wavelength range around 980 nm to 1100 nm. Other rare-earth elements, like erbium, neodymium, or thulium, can be used for amplification at other wavelengths as appropriate to the particular applications.

Referring once again FIG. 5, curve 510 for 0.6 m of doped fiber has a gain of about 30 dB at the signal wavelength of 1064 nm. A substantial out-of-band gain peak is present at approximately 1030 nm. As illustrated for curve 510, the out-of-band gain peak is almost 60 dB. It will be appreciated that out-of-band gain peaks as shown provide a high value of gain and may result in parasitic lasing or instabilities in the vicinity of 1030 nm. As a result of such parasitic lasing or instabilities, the available gain may be limited and the noise may be increased at the wavelength of interest (1064 nm)

Embodiments of the present invention provide amplifier and/or laser designs that account for the presence of any such substantial out-of-band gain peak. In some conventional approaches, a technique to lower the out-of-band gain peak is to lengthen the optical fiber, which favors the re-absorption of short-wavelength signals, thus lowering their gain. This is exemplified by curves 512 and 514, which illustrate the effect of increasing the fiber length to 5 m and 10 m, respectively. However, increasing the fiber length results in increased gain at longer wavelengths. As shown in FIG. 5, increasing the length of the fiber to 10 m (curve 514) results in a gain of about 50 dB at the wavelength of interest of 1064 nm. Therefore, some conventional techniques present difficulties in designing an amplifier characterized by a specific gain value while maintaining a desired spectral gain profile at the same time.

Another approach used in some conventional designs is to vary the pump level to adjust the gain. For example, in the 10 m fiber illustrated by curve 514 in FIG. 5, the 50 dB gain at 1064 nm could be lowered by reducing the pump power below 40 W. However, a lower optical pump power generally results in an increase in the recovery time of the amplifier, which may not be desirable since high pump powers are typically required to operate the amplifier at high pulse repetition rates. Therefore, these conventional designs present difficulties in achieving a target gain and a fast recovery time at the same time.

Figure 6:
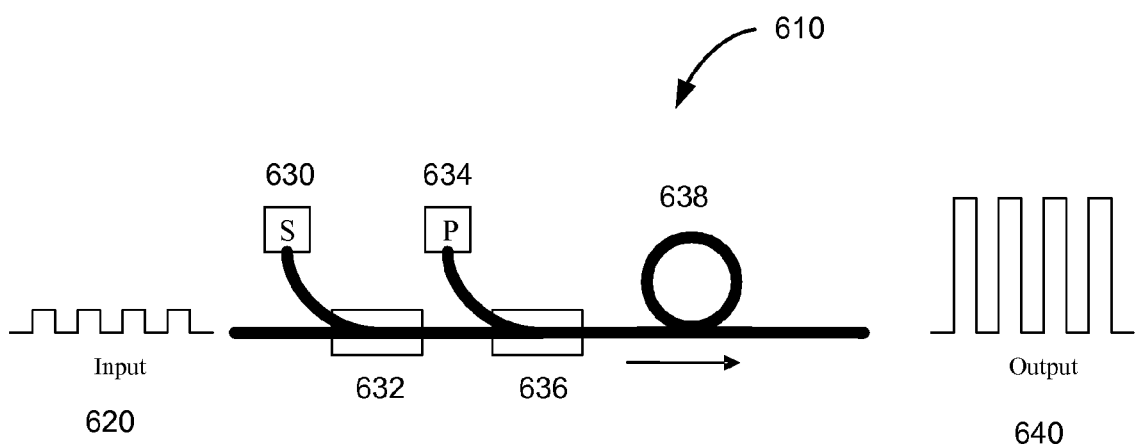
FIG. 6 is a simplified schematic diagram of an optical fiber amplifier with reduced out-of-band gain according to another embodiment of the present invention.

FIG. 6 is a simplified schematic diagram of an optical fiber amplifier with reduced out-of-band gain according to another embodiment of the present invention. Optical amplifier 610 amplifies an input optical pulse train 620 at 1064 nm to provide an output optical pulse train 640 at 1064 nm. Optical fiber amplifier 610 includes a length of rare-earth-doped fiber gain medium 638. In embodiments of the present invention, the length of rare-earth-doped fiber includes, but is not limited to rare-earth-doped single-clad, double-clad, or even multiple-clad optical fibers. The rare-earth dopants used in such fibers include ytterbium, erbium, holmium, praseodymium, thulium, or neodymium. In a particular embodiment, the fiber-optic based components utilized in constructing optical amplifier 610 utilize polarization-maintaining single-mode fiber. In another particular embodiment, the fiber is doped with ytterbium at a level of around $9.2 \times 10^{25}$ $cm^{-3}$.

In particular embodiments, an optical pump 634 is coupled to a first side of the rare-earth-doped fiber 638 through an optical coupler 636. In a particular embodiment, optical coupler 636 is a Wavelength Division Multiplexer (WDM) or a multimode pump combiner with signal feedthrough, which are available from, for example, Sifam Fibre Optics of Torquay, UK. According to an embodiment of the present invention, a semiconductor pump laser 634 with a wavelength in the range of 910 nm-1000 nm (e.g., 976 nm) and a power of about 40 W is utilized. Although a single pump laser 634 lasing is illustrated in FIG. 6, one or more semiconductor or other lasers may be utilized in alternative embodiments. One of ordinary skill in the art would recognize many variations, modifications, and alternatives. In a particular embodiment, pump laser 634 is a multi-mode semiconductor laser and the pump power is injected in the ytterbium-doped fiber clad using a multimode fiber combiner 636.

According to an embodiment of the present invention, optical fiber amplifier 610 utilizes seed light from seed source 630 at a different wavelength than the light from the pump source 634 and the input pulse 620. Preferably, the seed source has a wavelength located between the pump source wavelength and the input pulse wavelength. As described more fully throughout the present specification, embodiments of the present invention clamp the gain peak to provide numerous benefits. As illustrated in FIG. 6, seed light is provided by a seed source 630 that is injected into the rare-earth-doped fiber by an optical coupler 632. In a particular embodiment, the seed light is provided by a semiconductor laser operating at a wavelength of about 1030 nm, having an optical power between about 50 mW and about 500 mW, and is injected into the ytterbium-doped fiber core using a wavelength division multiplexer 632. In yet another embodiment, the seed light from seed source 630 is provided by ASE from an optically pumped ytterbium-doped fiber amplifier and can propagate collinearly with the optical input signal 620.

The following discussion provides a description of a gain clamping mechanism, although embodiments of the present invention are not limited to this particular description. When a signal is amplified strongly, it extracts energy from the gain medium and consequently the gain is lowered. As applied to the optical amplifier 610, the 976 nm pump is absorbed in the fiber and generates broad band gain at wavelengths of both 1030 nm and 1064 nm. The input of a strong seed signal at 1030 nm results in the seed signal being strongly amplified, and by extracting energy from the amplifier, lowers the gain at 1030 nm. It will be appreciated that the 976 nm pump energy in the inner clad is substantially converted into 1030 nm light in the core, which pumps the core of the optical fiber to provide gain at longer wavelengths, including at 1064 nm. The absorption and conversion of the 976 nm pump energy to pump energy at 1030 nm results in pumping effectively occurring at 1030 nm. Since the effective pumping wavelength is 1030 nm, the gain at this wavelength is 0 dB for the condition in which the gain is fully inverted along the length of the fiber. Only a small portion of the optical fiber where the 976 nm to 1030 nm conversion occurs contributes any residual gain at 1030 nm. Therefore, any gain excess at 1030 nm is minimized.

High power lasers are not as readily available at 1030 nm as at other wavelengths. To achieve high output power from an amplifier, pump power in excess of 50 W is often required. Referring to FIG. 6 again, in an embodiment of the present invention, a single mode continuous wave (CW) semiconductor seed laser 630 with an output power between 50 mW and 100 mW at a wavelength about 1030 nm is coupled into an ytterbium-doped fiber 638 using a Wavelength-Division-Multiplexer (WDM) 632. The ytterbium-doped fiber 638 is typically a double-clad fiber with a core-diameter of about 30 μm and an inner clad diameter of 250 μm. Seed light from the seed laser 630 propagates into the 30 μm core of the fiber 638. Additionally, a multi-mode pump laser 634 of about 50 W at a wavelength between about 910 nm and 980 nm is coupled into the ytterbium-doped fiber 638 using a multimode combiner 636. The pump light from the pump laser 634 propagates dominantly in the 250 µm inner clad of the fiber 638. The pump light being absorbed in the fiber strongly amplifies the seed light resulting in a significant conversion of pump light into seed light at 1030 nm and saturation of the gain at 1030 nm. Typically the conversion would result in about 30 W to about 40 W of 1030 nm light propagating in the core. Therefore, the amplifier, instead of being clad pumped at 976 nm is now being core pumped at 1030 nm.

A pulsed input light signal 620 at 1064 nm is amplified to provide an output light signal 640. It will be appreciated that although the gain is saturated at 1030 nm because of the seed laser, there is sufficient gain left at 1064 nm to amplify a signal by 30 dB by selecting a predetermined length for the ytterbium-doped fiber depending on the application. As the fiber length is increased, a larger fraction of the pump light is converted into seed light along with an increase in the 1064 nm gain. In the current embodiment, the same double-clad ytterbium-doped fiber is used simultaneously to generate core pump light at 1030 nm and to amplify a 1064 nm signal.

Figure 7:
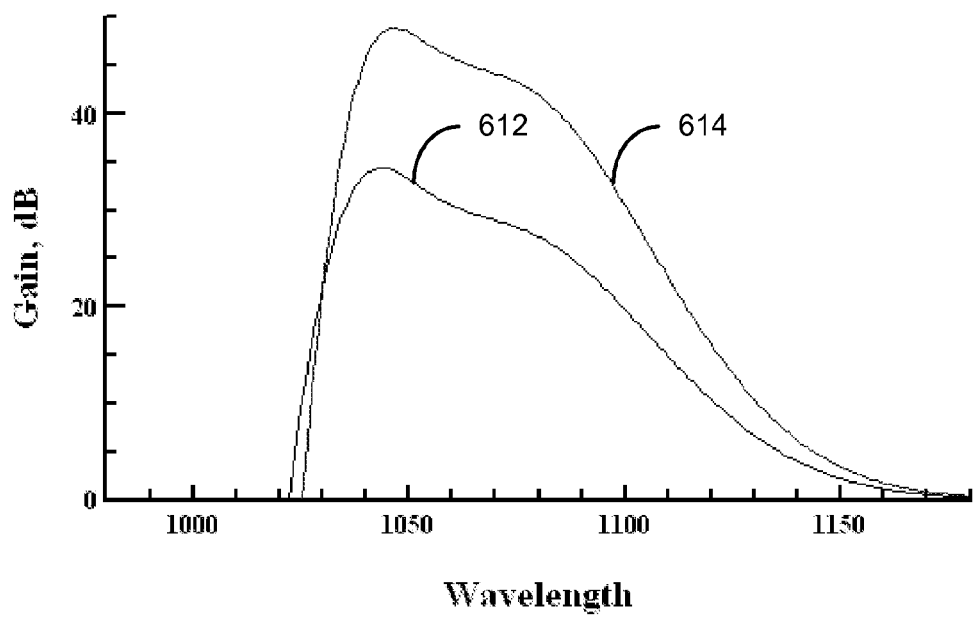
FIG. 7 is a simplified illustration of spectral gain of an optical fiber amplifier with reduced out-of-band gain according to another embodiment of the present invention.

FIG. 7 is a simplified illustration of a gain spectrum of an optical fiber amplifier according to another embodiment of the present invention. For comparison, FIG. 7 illustrates gain spectra associated with the same ytterbium-doped optical fiber with a doping level of $9.2 \times 10^{25}$ cm$^{-3}$ as illustrated in FIG. 5. To obtain the data illustrated in FIG. 7, a double-clad fiber with a 30 µm core and a 250 µm inner clad was utilized. Additionally, a pump power of 40 W at 976 nm and a seed power of 200 mW at 1030 nm was utilized. Curve 612 has a gain of around 30 dB at 1064 nm using a 2.7 m fiber length. Curve 614 has a gain of around 45 dB at 1064 nm using a 5 m fiber length. For either spectrum, the out-of-band gain minus the in-band gain is less than 5 dB. Therefore, utilizing embodiments of the present invention it is possible to adjust the absolute gain and to minimize the gain ripple at the same time.

Embodiments of the present invention may be utilized in a wide variety of applications including micro-machining, laser trimming, laser drilling, and the like. One of ordinary skill in the art would recognize many variations, modifications, and alternatives.

Embodiments of the present invention provide a pulsed fiber amplifier having its gain medium fully inverted along its length. Accordingly, independent control is available over the total amplifier gain and the recovery time of the gain between optical pulses. This fiber amplifier is particularly suited for the amplification of optical pulses with constant pulse-to-pulse characteristics and the occurrence of first pulse overshoot is reduced compared to conventional techniques.

During applications including marking, engraving, micro-machining, cutting, and the like, depending on the applications and the material to be processed, the pulse characteristics of the laser, including the pulse width, the repetition rate, the peak power, and/or the energy per pulse is adapted for the task at hand. Usually, when the laser is operated in a pulse-on-demand mode, the first optical pulse tends to be more powerful than the following pulses. This is generally an undesirable effect. An explanation, not intended to limit embodiments of the present invention, is that the energy stored in the laser gain medium is depleted significantly after the first pulse and is not fully replenished by the time the next pulse comes along. In other words, the optical gain doesn't usually recover rapidly enough between pulses to provide consistent pulse to pulse power characteristics. In some systems, the first pulse problem is addressed using complex electronic control methods.

Also, conventional fiber amplifiers are generally operated in such a way that the total gain, the gain recovery time, and the output pulse energy are not independent of each other. Varying one parameter generally results in undesired variations in the other parameters. For example, to reduce the gain recovery time, one can increase the pump power, which would also increase the total gain available to the first pulse. This latter is not necessarily desirable because then one would have to either accept an increased power first pulse, or decrease the input pulse energy to compensate for it.

Thus, there is a need in the art for systems and techniques that provide laser amplifiers that reduce the power difference between the first pulse and subsequent pulses.

According to embodiments of the present invention, a fiber amplifier is provided as an optical amplifier. The methods and systems described herein are also applicable to other amplifiers including solid-state amplifiers such as, but not limited to, solid-state rod amplifiers or solid-state disk amplifiers.

In a typical optical fiber amplifier, the fiber is pumped by an optical beam, typically a laser. In a doped fiber, this pump light is absorbed within the fiber by ions of the added rare-earth elements. Typically, the absorbed light causes the rare-earth ions to be excited from their ground state to a higher energy or "upper-level" state. Ions in this upper level state are said be "inverted." It is the inverted ions that provide gain to the optical signal, and the amount of gain is determined by the proportion of rare-earth ions that are in the inverted state. This fraction is commonly referred to as "the inversion." Depending on the wavelength of the pump light, there is a maximum inversion that can be attained. When this maximum inversion is reached, the optical fiber is said to be "fully inverted." This maximum inversion decreases monotonically with increasing pump wavelength.

Figure 8A:
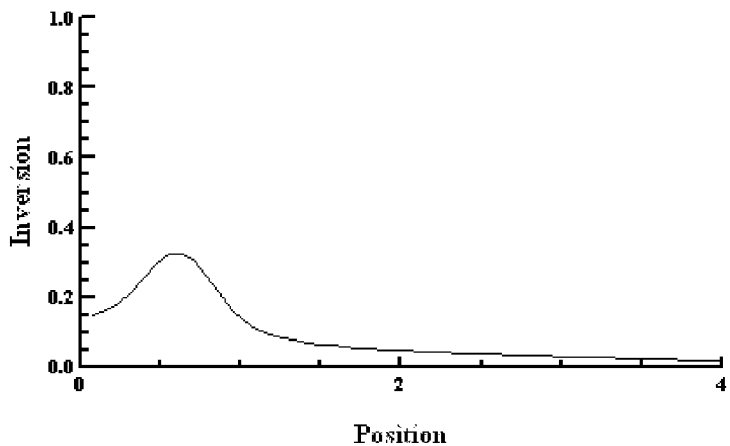
FIGS. 8A, 8B, and 8C illustrate population inversion, ASE intensity, and residual pump power along a fiber length for a pumping power of 20 W.
Figure 8B:
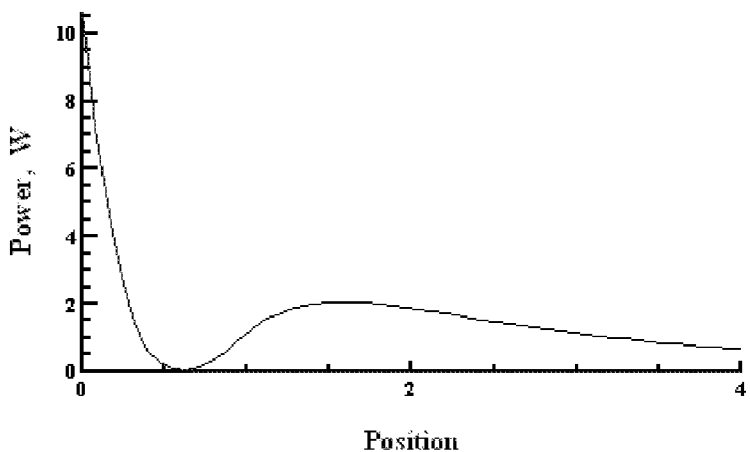
Figure 8C:
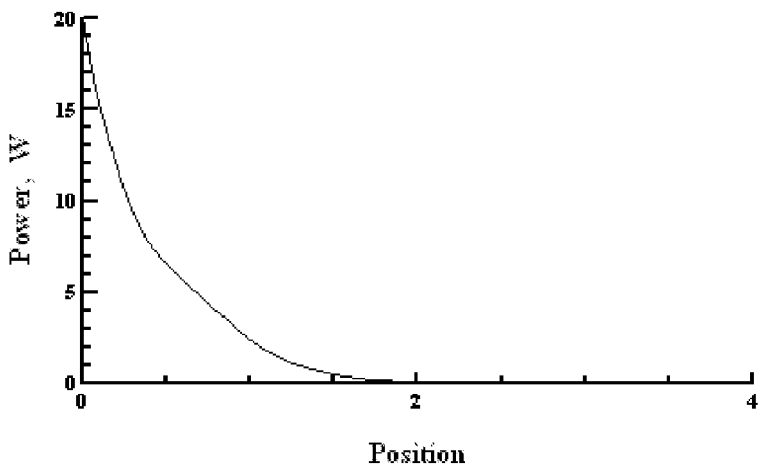
Figure 9A:
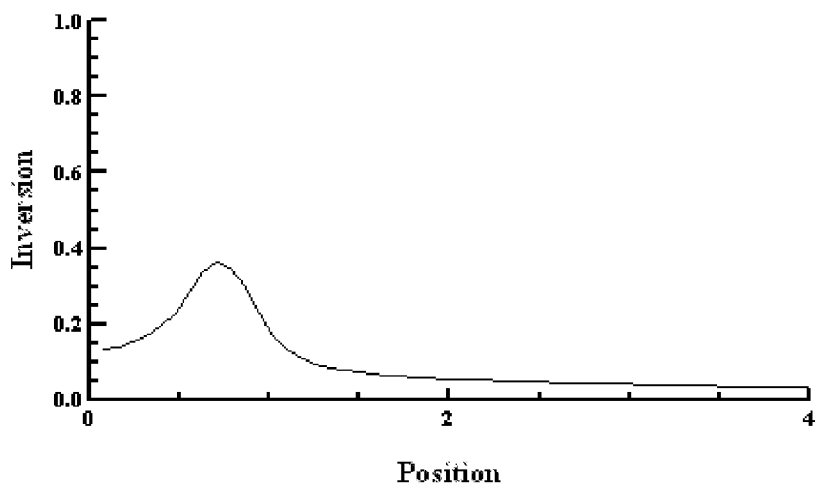
FIGS. 9A, 9B, and 9C illustrate population inversion, ASE intensity, and residual pump power along a fiber length for a pumping power of 40 W.
Figure 9B:
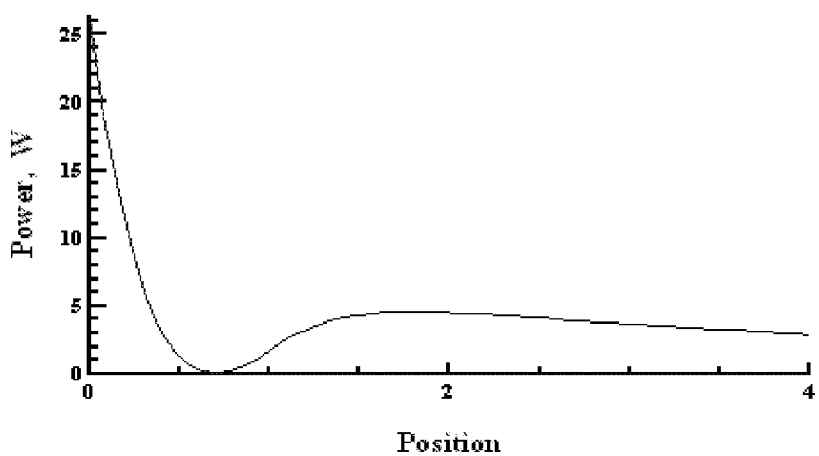
Figure 9C:
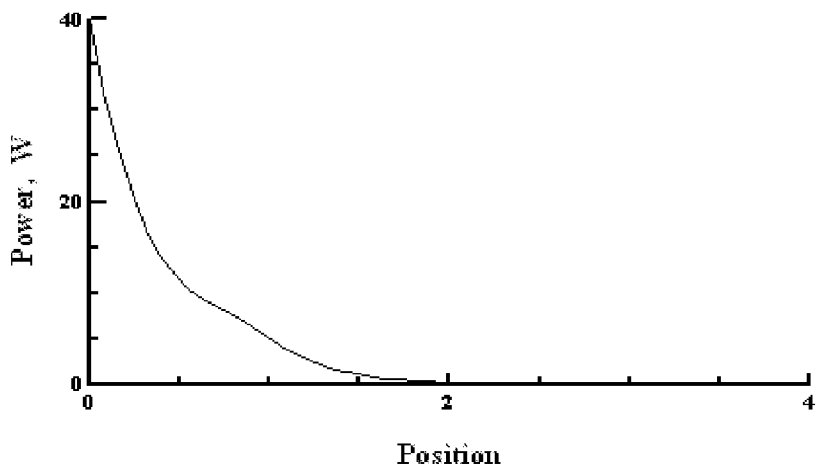

FIGS. 8A, 8B, and 8C illustrate the population inversion, the ASE intensity, and the residual pump power along a fiber length for a pumping power of 20 W. FIGS. 9A, 9B, and 9C illustrate the upper-level population and the residual pump power along a fiber length for a pumping power of 40 W. Referring to FIGS. 8 and 9, the inversion, the ASE intensity, and the residual pump power along a length of ytterbium-doped double-clad fiber are illustrated. In the example illustrated the fiber length is 4 m. The ytterbium-doped, double-clad fiber as a core diameter of 30 mm and an inner clad diameter of 250 mm. The ytterbium doping level is 1.4%.

FIGS. 8 and 9 represent a condition in which the amplifier is in the steady-state condition, with no pulses going through it. It should be noted that the inversion is not constant along the fiber length and that the inversion is different for the two input pump powers. For 20 W pump power, the maximum of the inversion reaches about 0.35, whereas for 40 W pump power the maximum of the inversion reaches about 0.40. In both cases, the inversion is strongly depressed by the forward- and backward-propagating ASE. As a result, the inversion is not maximized and the fiber is not fully inverted along its length. Referring to FIGS. 8 and 9, the low level of residual pump power present at the end of the fiber demonstrates that substantially all the pump power is absorbed within the fiber.

The amplifier pumped by 40 W will exhibit faster gain recovery between optical pulses than the amplifier pumped by 20 W. Unfortunately this faster gain recovery happens at the expense of an increase in the initial gain for the higher pump level. In general, for such an amplifier, it is not possible to change the gain recovery time without affecting the initial gain.

Figure 10A:
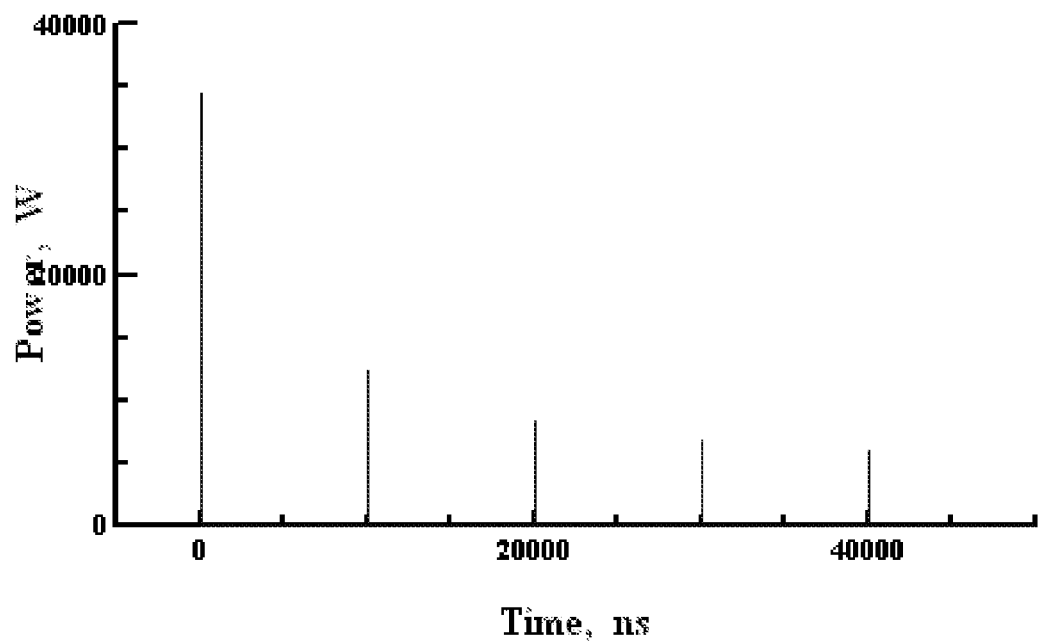
FIGS. 10A and 10B illustrate an example of the high energy first pulse problem and gain recovery times for a pumping power of 20 W.
Figure 10B:
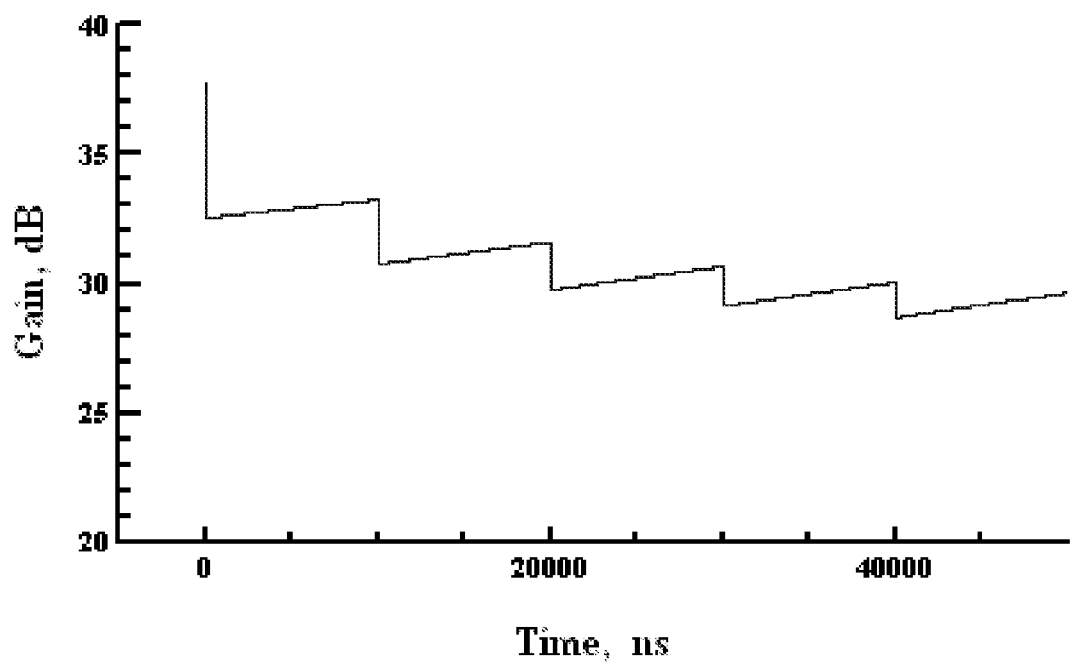
Figure 11A:
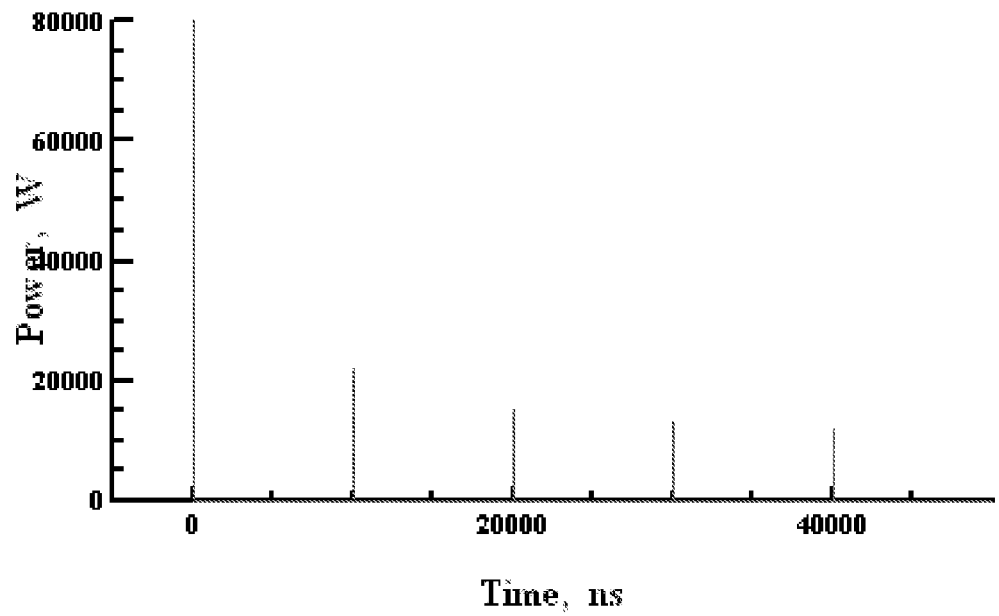
FIGS. 11A and 11B illustrate an example of the high energy first pulse problem and gain recovery times for a pumping power of 40 W.
Figure 11B:
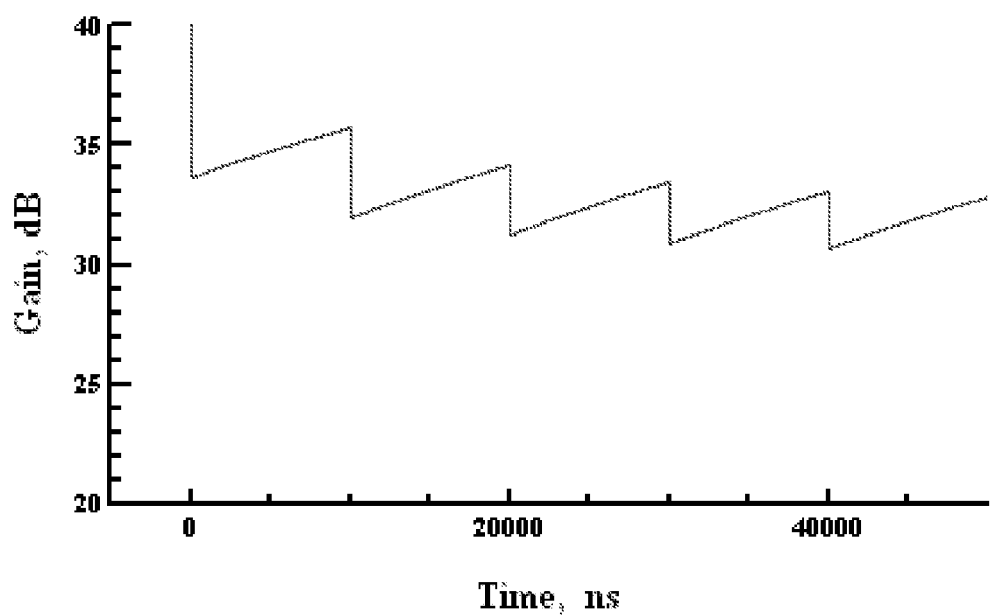

FIGS. 10A and 10B illustrate an example of the high energy first pulse problem and gain recovery time for a pumping power of 20 W. FIGS. 11A and 11B illustrate an example of the high energy first pulse problem and recovery time for a pumping power of 40 W. Referring to FIG. 10A, five optical pulses are illustrated. As illustrated in FIG. 10A, the peak power is greater in the first pulse than in any of the subsequent pulses. Thus, the high energy first pulse problem discussed above is illustrated. FIG. 10B illustrates the gain as a function of time showing a quick decrease after each pulses and a slow incomplete recovery between pulses. Comparing FIGS. 10B to 11B, the amplifier pumped by 40 W does recover more quickly than the amplifier pumped by 20 W as illustrated by the higher slope of the gain between pulses. Also, it can be seen that the energy of the first pulse is almost always higher than the energy of the following pulses, in some cases by approximately an order of magnitude. Comparing FIGS. 10A to 10B, the first pulse of the amplifier pumped by 40 W is more energetic than the first pulse of the amplifier pumped by 20 W illustrating the fact that the amplifier gain is larger when pumped by 40 W than 20 W. Therefore the amplifier gain and the gain recovery time are strongly coupled together.

Embodiments of the present invention utilize gain medium, in particular, rare-earth doped fibers that are generally shorter in length than conventional fiber amplifiers. In some embodiments, the fiber amplifiers are pumped at pump power levels higher than convention pump power levels. As a result of these conditions, either alone or in combination, embodiments of the present invention provide optical amplifiers that differ from conventional amplifiers in at least the way the inversion and the pump power absorption behave.

FIG. 12 illustrates the upper-level population, the residual pump power, and the gain profile at 1028 nm wavelength along a fiber length for a pumping power of 20 W according to an embodiment of the present invention. FIG. 13 illustrates the upper-level population, the residual pump power, and the gain profile at 1028 nm along a fiber length for a pumping power of 40 W according to an embodiment of the present invention. FIGS. 12 and 13 illustrate profiles along a length of ytterbium-doped double-clad fiber similar to that used to obtain the data shown in FIGS. 8A and 8B. In this example, the fiber length is 0.8 m and the input pump powers are 20 W and 40 W, respectively. It should be noted that for both input pump powers, the fiber is substantially fully inverted along its entire length. Also, it can be seen that according to embodiments of the present invention, the percentage of the pump light absorbed within the fiber is less than in conventional amplifiers. Indeed, it can be shown that the fiber would provide a similar inversion profile with as little as 3 W of pump power. As discussed more fully throughout the present specification, the maximum value of the inversion is determined, in part, by the wavelength of the pump laser. Referring to FIG. 2, for the results presented in FIGS. 12 and 13, the wavelength of the pump laser is 975 nm, and the corresponding maximum value of the inversion is approximately 50%.

As discussed above, the gain available from the fiber amplifier is a function of the population inversion. Utilizing embodiments of the present invention, the gain of the amplifier is fixed at some predetermined value, and remains independent of the amount of pump power, provided the pump power is maintained above a certain lower limit (which in the case of the example of FIGS. 12 and 13, would be ~3 W). The value of the fixed gain is chosen by selecting an appropriate fiber length, and would depend upon the specific application. The actual value of the gain in decibels (dB) of an amplifier constructed according to embodiments of the present invention would vary linearly with the fiber length for a given fiber design, which simplifies the amplifier design.

Figure 14:
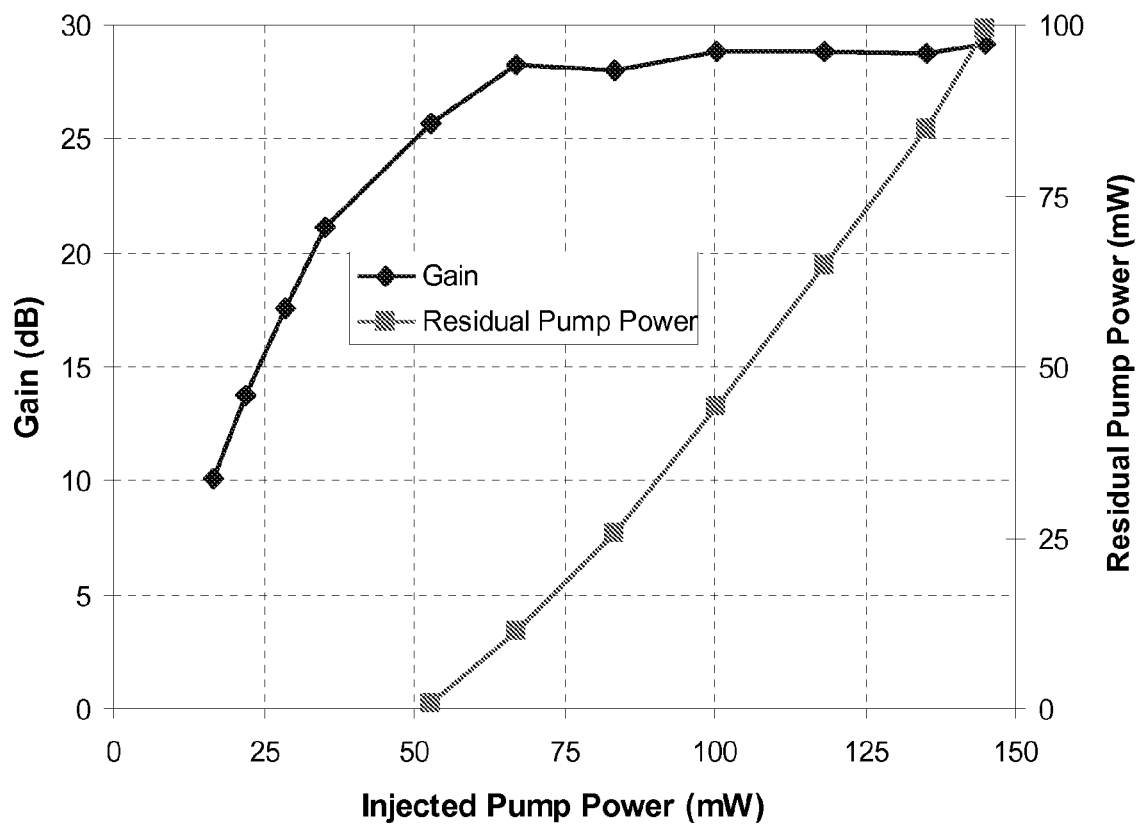
FIG. 14 illustrates gain and residual pump power as a function of the injected pump power in an amplifier provided according to an embodiment of the present invention.

FIG. 14 illustrates gain and residual pump power as a function of the injected pump power in an amplifier provided according to an embodiment of the present invention. For the data presented in FIG. 14, a 5 m length of Yb-doped single-clad fiber having a doping density of approximately $5 \times 10^{24}$ ions/m$^3$ was utilized. FIG. 14 presents a measurement of the amount of residual pump power not absorbed within the fiber. The residual pump power is the amount of pump power that is emitted from the end of the fiber after passing through the fiber. The figure also present a measurement of the single-pass small-signal gain at a wavelength of approximately 1032 nm.

FIG. 14 demonstrates that for pump power levels greater than a certain threshold value, for example, greater than about 50 mW, some or most of the pump power is transmitted through the fiber and emitted from the other end. FIG. 14 also demonstrates that at pump powers above the threshold value, the single-pass gain is essentially clamped, for example, for the aforementioned conditions, at approximately 28 dB. The correlation between the lack of pump absorption and the clamping of the gain is believed, without limiting embodiments of the present invention, to result from the fiber being fully inverted along its length. Accordingly, as additional pump power is supplied, the inversion, and consequently the gain, shows little to no further increase.

It can be recognized that the pump power as discussed in these embodiments can be provided by an amplified seed signal as discussed in the context of FIG. 6. In a particular embodiment as illustrated in FIG. 6, the power of the seed 630 is high enough, for example greater than 50 mW, or even greater than 100 mW, to result in a significant conversion of the power of the pump 634 into seed power, resulting in the amplification of the seed signal. The seed signal hence generated acts as pump power to the fiber amplifier. For seed power levels greater than a certain threshold value, for example, greater than about 50 mW, some or most of the seed power is transmitted through the fiber and emitted from the other end as illustrated previously in FIG. 14. Under these conditions, the single-pass gain is essentially clamped, which results in the fiber being fully inverted along its length. Consequently in certain embodiments of the present invention, the word "pump" in FIGS. 12, 13, and 14 can be replaced by the word "seed" when utilized in the context of embodiments illustrated in FIG. 6.

Embodiments of the present invention provide methods and systems characterized by substantially uniform inversion as a function of fiber length as well as pumping at high levels (e.g., at levels where significant portions of the pump power, for example, greater than 50%), are not absorbed by the active medium. Moreover, embodiments provide methods and systems that utilize pumping at wavelengths longer than conventional systems, thereby providing gain at signal wavelengths that is greater than gain at out-of-band wavelengths. However, the embodiments are not limited to combinations of these characteristics as they may be provided separately or in sub-combinations.

Without limiting embodiments of the present invention, it is possible to derive the following expression for the "Critical Power." $P_{cr}$ in a doped fiber: $P_{cr} = A_d E_p / (\chi_a + \chi_e) \Gamma \tau$ where $A_d$ is the area of the doped region of the fiber, $E_p$ is the energy of a photon of pump light, $\chi_a$ and $\chi_e$ are respectively the absorption and emission cross-sections of the dopant in the fiber at the pump wavelength, $\Gamma$ is the confinement factor of the pump propagation mode with respect to the dopant area, and $\tau$ is the excited state lifetime of the dopant in the fiber. It is also possible to derive the following expression relating the inversion i in the fiber to the pump power P in terms of the Critical Power; $i=i_{sat}/(1+P_{cr}/P)$, where $i_{sat}$ is the saturated inversion. From this expression it can be seen that i approaches $i_{sat}$ as P exceeds $P_{cr}$. Based on these computations, in an embodiment, as the pump light propagates along the fiber, the inversion will be approximately saturated at all points where P exceeds approximately three times the Critical Power. Thus, as illustrated herein, if the residual pump power exceeds approximately three times the Critical Power, then the inversion throughout the whole fiber will be approximately equal to the saturated inversion.

The Critical Power for the "seed" signal can be substantially different from the Critical power for the "pump" signal. In particular, the confinement factor Γ, and the values of the cross sections $\chi_a$ and $\chi_e$, can be significantly different in the two cases. When both "pump" and "seed" light are present in the fiber, it is possible to derive an expression relating the inversion in the fiber to both the "pump" power and the "seed" power in terms of the Critical Powers of each signal. From this derived expression it can be shown that if the "seed" power exceeds approximately three times the Critical Power for the "seed" signal, and the "pump" power is less than approximately half of the Critical Power for the "pump" signal, then the inversion will be approximately equal to the saturated inversion for the "seed" wavelength. In this circumstance, substantial conversion of pump light to seed light can result in an amplifier whose inversion is approximately or substantially uniform throughout the whole fiber, at the lower saturated inversion level of the seed wavelength.

Thus, utilizing embodiments of the present invention, it is possible to adjust the amplifier recovery time by adjusting the amount of pump power, without affecting the amplifier gain and the optical output energy. To increase the recovery time, increases in pump power are provided. Additionally, embodiments of the present invention provide methods and systems in which extra pump power, which would generally result in the occurrence of a giant pulse in conventional amplifiers and an associated fast recovery time, will not result in significant additional gain, thereby self-limiting the gain of the amplifier.

The following systems are included within the scope of various embodiments of the present invention:

An optical amplifier or laser including an optical gain medium and an optical pump having a wavelength selected such that the out-of-band gain is substantially smaller than the in-band gain.

An optical amplifier or laser including an optical gain medium and an optical pump having a wavelength selected such that the out-of-band gain is reduced or minimized.

An optical amplifier or laser including an optical gain medium and an optical pump having a wavelength selected such that the out-of-band gain is substantially similar to the in-band gain.

An optical amplifier or laser including an optical gain medium and an optical pump having a wavelength selected such that the out-of-band ASE is reduced or minimized.

An optical amplifier or laser with the optical pump having a wavelength selected such that the out-of-band ASE is reduced or minimized.

In various embodiments, the gain medium comprises a rare-earth-doped optical fiber, which may be a single-clad, a double-clad, or a multiple-clad structure. The optical fiber may be a polarization-maintaining fiber. The rare-earth-doped optical fiber may include a combination of one or more rare-earth elements, including, but not limited to: ytterbium (Yb), erbium (Er), neodymium (Nd), thulium (Th), holmium (Ho), or praseodymium (Pr). The pump comprises a semiconductor diode laser, a fiber laser, a solid-state laser, combinations of these, and the like.

An optical amplifier or laser comprising a first length of ytterbium-doped optical fiber and an optical pump having its wavelength selected substantially in the range of 1000 nm to 1040 nm.

An optical amplifier or laser including a first length of ytterbium-doped optical fiber and an optical pumping means having its wavelength selected substantially in the range of 1020 nm to 1040 nm.

An optical amplifier or laser including a first length of ytterbium-doped optical fiber and an optical pump having its wavelength selected substantially in the range of 1025 nm to 1030 nm.

In various embodiments, the optical amplifier or laser includes an ytterbium-doped fiber comprising a single-clad fiber, a double-clad fiber, or a multiple-clad fiber. The ytterbium doping concentration may be in the range $1\times10^{24}$-$1\times10^{26}$ ions per m$^3$. The optical fiber may be of the polarization maintaining type. The pump may be a semiconductor diode laser, a fiber laser, a solid-state laser, combinations thereof, and the like.

The following systems are also included within the scope of various embodiments of the present invention:

An optical amplifier or laser including a first length of erbium-doped optical fiber and an optical pump having its wavelength selected substantially in the range of 1490 nm to 1535 nm.

An optical amplifier or laser including a first length of erbium-doped optical fiber and an optical pump having its wavelength selected substantially in the range of 1500 nm to 1530 nm.

An optical amplifier or laser including a first length of erbium-doped optical fiber and an optical pump having its wavelength selected substantially in the range of 1515 nm to 1525 nm. The erbium-doped fiber may include a single-clad fiber having a erbium doping concentration in the range $1\times10^{24}$-$1\times10^{26}$ ions per m$^3$. The optical fiber may be of the polarization maintaining type. The pump may be a semiconductor diode laser, a fiber laser, a solid-state laser, combinations thereof, and the like.

An optical amplifier including an optical pump adapted to operate at a pumping wavelength, an optical signal adapted to be amplified at a signal wavelength, and a gain clamp seed adapted to operate at a seed wavelength. In an embodiment, the optical pump, the optical signal, and the gain clamp seed are all concurrently injected in an optical gain medium.

An optical amplifier including an optical pump adapted to operate at a pumping wavelength, an optical signal adapted to be amplified at a signal wavelength, and a gain clamp seed adapted to operate at a seed wavelength. The optical pump, the optical signal, and the gain clamp seed are all concurrently injected in an optical gain medium such that the optical power of the gain clamp seed is operable to limit the optical gain outside of the signal wavelength to a level less than 5 dB above the gain at the signal wavelength. According to various embodiments, the optical amplifier includes a fiber amplifier, which may be a rare-earth-doped fiber gain medium, the optical pump includes one or more semiconductor lasers, and the gain clamp seed includes one or more semiconductor lasers.

The rare-earth-doped optical fiber may include ytterbium, erbium, thulium, holmium, praseodymium, or neodymium. The rare-earth-doped fiber may be of the single-clad type, double-clad type, or multi-clad type.

An ytterbium-doped optical fiber amplifier including an optical pump comprising at least one semiconductor laser at a pumping wavelength between 910 nm and 1000 nm, an optical signal adapted to be amplified, the optical signal having a wavelength between 1050 nm and 1100 nm, and a gain clamping semiconductor seed having a wavelength between 1000 nm and 1050 nm. The optical pump, the optical signal, and the gain clamping semiconductor seed are all injected into a common length of ytterbium-doped fiber.

The optical fiber amplifier further includes an optical coupler adapted to couple the pump light, the signal light and the gain clamping semiconductor seed light into the common length of ytterbium-doped fiber. The optical gain outside of the signal wavelength is less than 5 dB higher than the optical gain at the signal wavelength according to an embodiment. The gain clamping semiconductor seed is characterized by a power higher than 10 mW in another embodiment. The ytterbium-doped fiber may be of the single-clad type, double-clad type, or multi-clad type and may further include other doping elements.

The following systems are additionally included within the scope of various embodiments of the present invention:

An optical amplifier including a pump and a gain medium, wherein the gain medium is substantially fully inverted along its length. The pump may be a semiconductor diode laser, a fiber laser, a solid-state laser, combinations of these, or the like. The gain medium may include a rare-earth-doped optical fiber, with either a single-clad, double-clad, or multiple-clad structure. The optical fiber may include a polarization-maintaining fiber. The rare-earth-doped optical fiber may include a combination of one or more rare-earth elements including ytterbium (Yb), erbium (Er), neodymium (Nd), thulium (Th), holmium (Ho), or praseodymium (Pr).

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of operating a fiber amplifier characterized by a spectral gain curve, the method comprising:
    providing an input signal at a signal wavelength, wherein the signal wavelength lies within an in-band portion of the spectral gain curve extending from a first in-band wavelength to a second in-band wavelength, the in-band portion being characterized by a first amplitude range;
    providing pump radiation at a pump wavelength, wherein the pump wavelength is less than the signal wavelength and the pump radiation is characterized by a pump power;
    coupling the pump radiation to the fiber amplifier;
    absorbing a portion of the pump radiation in the fiber amplifier, wherein a power of the pump radiation exiting an output end of the fiber amplifier is greater than or equal to a power of the portion of the pump radiation absorbed in the fiber amplifier; and
    amplifying the input signal to generate an output signal, wherein all portions of the spectral gain curve at wavelengths less than the first in-band wavelength and greater than the pump wavelength are characterized by a second amplitude less than or equal to 10 dB greater than the first amplitude range.

2. The method of claim 1 wherein all portions of the spectral gain curve at wavelengths less than the first in-band wavelength are characterized by a second amplitude less than the first amplitude range.

3. The method of claim 1 wherein the first in-band wavelength, the second in-band wavelength, and the signal wavelength are a single wavelength.

4. The method of claim 1 wherein coupling the pump radiation to the fiber amplifier comprises absorption of the pump radiation in the fiber amplifier resulting in a substantially uniform population inversion as a function of fiber length.

5. The method of claim 4 wherein a value of pump power exiting an output end of the fiber is at least greater than or equal to a value of pump power absorbed in the fiber.

6. The method of claim 4 wherein a value of pump power exiting an output end of the fiber is at least greater than or equal to three times a critical power.

7. The method of claim 4 wherein substantially uniform is within 10% of a peak inversion value.

8. The method of claim 1 wherein the in-band portion of the spectral gain curve is centered at the signal wavelength.

9. The method of claim 1 wherein a gain ion of the fiber amplifier comprises ytterbium and the pump wavelength is greater than 1 µm.

10. The method of claim 9 wherein a gain ion of the fiber amplifier comprises ytterbium and the pump wavelength ranges between 1025 nm and 1035 nm.

11. A fiber amplifier system including a fiber amplifier characterized by a spectral gain curve determined, in part, by a pumping wavelength, the fiber amplifier system comprising:
    a pump laser operable to provide pump radiation at a pump wavelength;
    a seed laser operable to provide signal radiation at a signal wavelength greater than the pump wavelength; and
    a fiber amplifier having a spectral gain curve including an in-band portion characterized by a first amplitude range and an out-band portion characterized by a second amplitude range, wherein:
        the second amplitude range is at least 10 dB greater than the first amplitude range when the pump wavelength is less than a predetermined wavelength; and
        the second amplitude range is not greater than 10 dB more than the first amplitude range when the pump wavelength is greater than the predetermined wavelength.

12. The fiber amplifier system of claim 11 wherein the signal wavelength is within the in-band portion of the spectral gain curve.

13. The fiber amplifier system of claim 11 wherein the predetermined wavelength is less than the signal wavelength.

14. The fiber amplifier system of claim 11 wherein the pump radiation is characterized by a pump power and a power of the pump radiation exiting an output end of the fiber amplifier is greater than or equal to a power of a portion of the pump radiation absorbed in the fiber amplifier.

15. The fiber amplifier system of claim 14 wherein the population inversion in the fiber amplifier as a function of fiber length is substantially uniform.

16. The fiber amplifier system of claim 15 wherein substantially uniform comprises a population inversion within 10% of a peak inversion value.

* * * * *